US007017824B1

(12) United States Patent
Thiriet

(10) Patent No.: US 7,017,824 B1
(45) Date of Patent: Mar. 28, 2006

(54) LOADING COMPUTER PROGRAMS IN BLOCKS

(75) Inventor: Fabien Thiriet, Orleans (FR)

(73) Assignee: Axalto SA, Montrouge (FR)

( * ) Notice: Subject to any disclaimer, the term of this patent is extended or adjusted under 35 U.S.C. 154(b) by 0 days.

(21) Appl. No.: 09/622,657

(22) PCT Filed: Feb. 18, 1999

(86) PCT No.: PCT/FR99/00370

§ 371 (c)(1),
(2), (4) Date: Oct. 16, 2000

(87) PCT Pub. No.: WO99/42960

PCT Pub. Date: Aug. 26, 1999

(30) Foreign Application Priority Data

Feb. 23, 1998 (FR) ................................... 98 02147

(51) Int. Cl.
*G06K 19/06* (2006.01)
(52) U.S. Cl. ........................ 235/492; 235/379; 235/380
(58) Field of Classification Search ................. 235/379, 235/380, 492, 279; 340/568.7, 5.6, 5.61, 340/5.64
See application file for complete search history.

(56) References Cited

U.S. PATENT DOCUMENTS 5,161,231 A * 11/1992 Iijima ........................... 710/15
5,790,885 A * 8/1998 Shona ........................... 710/5
5,856,659 A * 1/1999 Drupsteen et al. .......... 235/380
6,052,783 A * 4/2000 Quak et al. .................. 713/201
6,488,211 B1 * 12/2002 Everett et al. .............. 235/492
6,575,372 B1 * 6/2003 Everett et al. .............. 235/492

FOREIGN PATENT DOCUMENTS

| EP | 0 559 205 A | 9/1993 |
| EP | 0 563 997 A | 10/1993 |
| EP | 0 795 844 A | 9/1997 |
| WO | WO 90 05960 A | 5/1990 |
| WO | WO 94 24673 A | 10/1994 |

OTHER PUBLICATIONS

IBM (NN 8,710,337), Initialization Scheme for Smart Cards with Reloadable Control Store, Oct. 1, 1987.*
International Business Machines Corporation (EU 275 510), Smart card having external programming capability and method of making same.*

* cited by examiner

*Primary Examiner*—Michael G. Lee
*Assistant Examiner*—Kimberly D Nguyen
(74) *Attorney, Agent, or Firm*—Anderson & Jansson LLP; Pehr Jansson

(57) ABSTRACT

A method for loading computer programs into a portable object memory, in particular a chip card, from one or several transmitting devices $EM_1, \ldots EM_j, \ldots EM_p$, p being a whole number. The computer program is divided into n blocks $BLK_1, \ldots BLK_i, \ldots BLK_n$, n being a whole number greater than 1. Information $I(n)$ representing a number of blocks to be loaded is transmitted to the portable object. The blocks $BLK_1, \ldots BLK_i, \ldots BLK_n$ are loaded into the portable object memory, and each block $BLK_i$ loaded in the portable object is counted, restarting from the last block during re-loading, to avoid restarting from the beginning.

4 Claims, No Drawings

LOADING COMPUTER PROGRAMS IN BLOCKS

FIELD OF THE INVENTION

The invention concerns the loading of computer programs into a memory of a portable object, and particularly into a memory of a chip card.

Chip cards are portable objects constituted by a card body and a chip.

BACKGROUND OF THE INVENTION

The chip comprises an integrated circuit on the surface of a silicon substrate, said circuit specifically defining storage areas of the chip and a microcontroller part that handles, in particular, the management of the data among the various storage areas.

This chip, whether or not it is carried in an electronic module, is integrated into the card body and communicates with the outside world by means of electrical contacts or an antenna. Depending on its mode of communication, the card is said to be contact or non-contact, it being understood that there are so-called combined cards capable of communicating in both communication modes, with or without contact.

Conventionally, chip cards are used in applications in which they identify their holder and allow said holder, for example, to obtain a right, such as a right to access services or perform transactions.

Access to services sometimes requires a computer program to be loaded into a memory of the card.

However, these computer programs are increasing in size, currently reaching 8 KB and expected to reach 64 KB in the near future.

The throughput rate of the microcontroller of the card and the write time of the memories do not allow the instantaneous loading of large programs.

For example, the loading time of an 8-KB program into a non-contact card from a transmitting device is on the order of one minute, which is much too long to allow the loading of a program in the average time during which the card is in the effective electromagnetic field of said transmitting device, particularly given the fact that this device must handle a plurality of cards, as well as potential collisions between said cards.

In practice, the loading is then interrupted, and it is necessary to wait for the time spent in the field of another transmitting device to be long enough for the successful loading of the program in its entirety.

OBJECTS AND SUMMARY OF THE INVENTION

Thus, given the above, one problem that the invention proposes to solve is to allow the loading of a program without the loading time constraints that currently affect the successful loading of said program.

With respect to this problem, the subject of the proposed solution of the invention is a method for loading computer programs into a memory of a portable memory object having a contactless operating mode, particularly a chip card, from one or more transmitting devices EM1, ..., EMj, ..., EMp, p being a whole number greater than or equal to 1, characterized in that it comprises the following steps in which:

the computer program is divided into n blocks BLK1, ... BLKi, ..., BLKn, n being a whole number greater than 1;

a piece of information I(n) indicating the number n of blocks to be loaded is transmitted to the portable object;

the blocks BLK1, ..., BLKi, ..., BLKn are loaded without contact into a memory of the portable object;

the loading of the blocks BLK1, ..., BLKi, ..., BLKn is interrupted during the loading of a block;

the loading of the blocks is resumed; and each block BLKi loaded is counted in the portable object.

Advantageously, the method of the invention also comprises the following steps, in which: the loading of the blocks is interrupted during the loading of a block BLKi; the loading of the blocks is resumed with the block BLKi; means FLG in the portable object indicate to a transmitting device EMj the loading state FLG=Y or nonloading state FLG=N, of the portable object; and prior to the resumption of the loading of the block BLKi, the loading or nonloading state of the portable object is verified.

DETAILED DESCRIPTION OF THE PREFERRED EMBODIMENTS

The invention will be better understood through the reading of the non-limiting description below.

The method of the invention applies to portable memory objects, and preferably to chip cards whose format and properties are defined in the standards ISO 78-10 and 78-16, whose contents are incorporated into the present specification by reference, or more preferably, applies to such cards having a contactless operating mode, possibly in addition to a conventional contact operating mode, said cards being characterized in the standard ISO 14443.

Non-contact chip cards have an integrated circuit in a silicon substrate, the circuit and substrate assembly constituting the chip, said chip being integrated into an electronic module that is itself integrated into a card body, or integrated directly into said card body.

The integrated circuit defines various memories of the chip, including at least one volatile memory RAM and at least one nonvolatile memory ROM, this nonvolatile memory or any of the nonvolatile memories being, as necessary, an electrically erasable programmable memory EEPROM, or a memory of the Flash type PROM. Furthermore, this integrated circuit defines a central processor CPU or microcontroller, said central processor handling, in particular, the management of the data among the various memories, via an address bus and a data bus, said management being timed by clock cycles.

The invention is for loading a computer program PRG into one of the memories of the card, and particularly into a nonvolatile EEPROM type memory of said card.

Such a program PRG is a set of computer data, defining for example a set of instructions executable by the card. This is the case for application programs written in high-level languages of the Java type, known as applets. In one example, these are programs that allow access to services, as in the case of an ATM card, or a program that allows the card to perform electronic purse applications. The size of the programs PRG can vary. However, the invention is particularly advantageous in the case of programs of large size, on the order of or greater than 2 KB, for example 8 KB or even 64 KB, whose total practical loading time is greater than 5 seconds.

In the exemplary embodiment described in the present description, the program PRG is loaded into the memory EEPROM of the card, from one or more transmitting readers EM1, ..., EMj, ..., EMp, p being a natural whole number greater than or equal to 1, each transmitting device EMj having a copy of the program or being capable of obtaining such a copy from an associated server, under the control of an operator.

For its loading, the program PRG is divided, according to the invention, into n blocks BLK1, ..., BLKi, ..., BLKn, n being a natural whole number strictly greater than 1, all of the blocks BLKi advantageously having a similar size, preferably on the order of the memory space RAM reserved as a write buffer and called a buffer memory.

For example, a 2-KB computer program can be divided into eight blocks BLK1, ..., BLK8 of about 256 bytes each.

The card may or may not be in a loading state, i.e., a state in which it is waiting for the program PRG to be loaded.

When the card is in the loading state, a storage area FLG of the card, located in the memory EEPROM, is written with a datum, for example binary, indicating said loading state FLG=Y. Otherwise, FLG=N.

When the card enters the effective electromagnetic communication field of a transmitting device EM1, a contactless dialog is established between said card and said transmitting device EM1, during which dialog the loading state of the card is verified, or changed if a loading decision is made while the card is initially in the non-loading state FLG=N.

If FLG=Y and if the loading of the program PRG has not started, a piece of information (In) indicating the number n of blocks BLKi that the card should receive is transmitted by the transmitter EM1 to said card.

This indication I(n) is received by the card, particularly with the block BLK1, the set of I(n) and BLK 1 first being stored in the buffer memory of the card, then retrieved by the central processor, which stores the indication I(n), or an indication I'(n) derived from this indication I(n), in a storage area COUNT serving as a counter. Likewise, the block BLK1 is stored in the nonvolatile memory EEPROM at a given address, for example ADD1. When this block BLK1 is stored at this address ADD1, the counting memory COUNT is decremented to COUNT=n−1, indicating that there are n−1 blocks remaining to be loaded.

If the dialog between the transmitting device EM1 and the card is not interrupted, the block BLK2 is received, stored in buffer memory, then in EEPROM at the address ADD2, specifically following ADD1, and the counter COUNT is then decremented again to COUNT=n−2. The same thing is done for each of the blocks BLKi up to BLKn.

However, if the dialog between the transmitting device EM1 and the card is interrupted, for example in the case where the card leaves the effective electromagnetic field of the transmitter EM1, the loading of a block BLKi is interrupted, while the card is still in the loading state FLG=Y.

It is then necessary for the card to enter the field of a new transmitter EMj, which also has a copy of the program PRG divided into blocks BLK1, ..., BLKi, ... BLKn, in order for the loading to resume, or for the card to re-enter the field of the transmitter EM1. This new transmitter EMj can be the transmitter EM1.

EMj then interrogates the card, asking it if it is in a loading state. The card responds that this is in fact the case, based on the indication FLG=Y.

EMj then interrogates the card on the number of blocks loaded. The card responds that i−1 blocks have been loaded, based on the fact that COUNT=i−1.

The loading then resumes, with this new transmitter EMj, with the block BLKi and continues up to the block BLKn, unless a new interruption makes it necessary for the card to enter the field of a new transmitter EMj.

When the block BLKn is loaded, the counter is at zero COUNT=0, and the card is then placed in the non-loading state FLG=N.

Thus, no matter what the length of the program PRG to be loaded, a loading in blocks BLKi coupled with a counting of the blocks loaded makes it possible, particularly in the case of non-contact cards, to load an entire program without the interruptions of the dialog between the card and the transmitting devices requiring a new loading of the program from the start.

What is claimed is:

1. Method for loading computer programs into a memory of a portable memory object having a contactless operating mode, particularly a chip card, from one or more transmitting devices EM1, ..., EMj, ... EMp, p being a whole number, the method comprising:

the computer program is divided into n blocks BLK1, ..., BLKi, ..., BLKn, n being a whole number greater than 1;

a piece of information I(n) indicating the number n of blocks to be loaded is transmitted to the portable memory object;

the blocks BLK1, ..., BLKi, ... BLKn are loaded without contact into a memory of the portable memory object from a transmitting device EMj wherein j is in a range from 1 through p;

each block BLKi is counted in the portable memory object;

the loading of the blocks BLK1, ..., BLKi, ..., BLKn is interrupted during the loading of a block BLKi due to an interruption in communication between EMj and the card;

in response to establishing of communication between one of the transmitting device EMk and the card, wherein k is in a range 1 through p:

interrogating the card as to which block to resume loading, and resuming the loading of the blocks from block i from transmitting device EMk; and each block BLKi loaded is counted in the portable memory object.

2. Method according to claim 1, the method further comprises:

prior to the resumption of the loading of the block BLKi, the loading or nonloading state of the portable memory object is verified.

3. The method according to claim 1, wherein EMj and EMk are two distinct transmitting devices.

4. The method according to claim 1, further comprising:

setting a flag FLG to indicate whether the card is in a loading state or in a non-loading state; and upon establishing communication between one of the transmitting devices EMk and the card, interrogating the flag FLG to determine whether the card is in a loading state.

* * * * *